United States Patent [19]

Mallory

[11] 4,048,002
[45] Sept. 13, 1977

[54] TIRE BUILDING APPARATUS
[75] Inventor: Edwin F. Mallory, Niles, Mich.
[73] Assignee: National-Standard Company, Niles, Mich.
[21] Appl. No.: 375,750
[22] Filed: July 2, 1973
[51] Int. Cl.² ............................................ B29H 17/22
[52] U.S. Cl. ..................................... 156/403; 156/131
[58] Field of Search ............... 156/398, 131, 132, 135, 156/133, 400–403

[56] References Cited
U.S. PATENT DOCUMENTS

| | | | |
|---|---|---|---|
| 2,838,091 | 6/1958 | Kraft | 156/132 |
| 3,232,817 | 2/1966 | Nadler et al. | 156/398 |
| 3,374,138 | 3/1968 | Porter et al. | 156/403 X |
| 3,433,695 | 3/1969 | Caretta et al. | 156/401 |
| 3,694,290 | 9/1972 | Pacciarini et al. | 156/401 |

Primary Examiner—Charles E. Van Horn
Assistant Examiner—John E. Kittle
Attorney, Agent, or Firm—Johnson, Dienner, Emrich & Wagner

[57] ABSTRACT

A tire building apparatus having main frame means, and rotatable tire building drum means supported by the main frame means. A pair of tire bead placing and end ply bag turn-up ring means are supported on the main frame means and are movable axially inwardly and outwardly longitudinally of the drum means. Positive stop means are carried by the main frame means and are engageable by the ring means for locating the latter in precise predetermined inward bead set positions.

17 Claims, 15 Drawing Figures

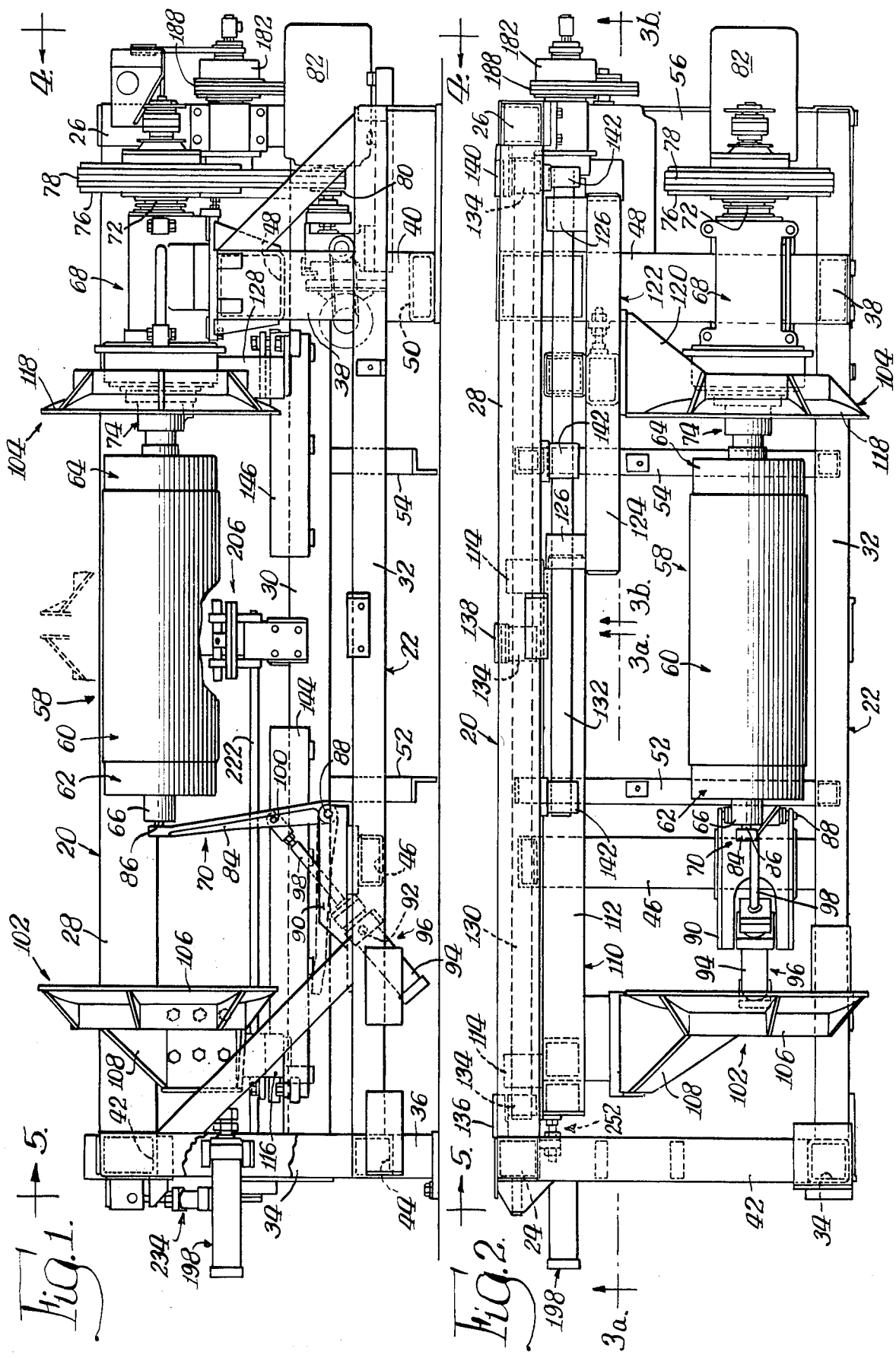

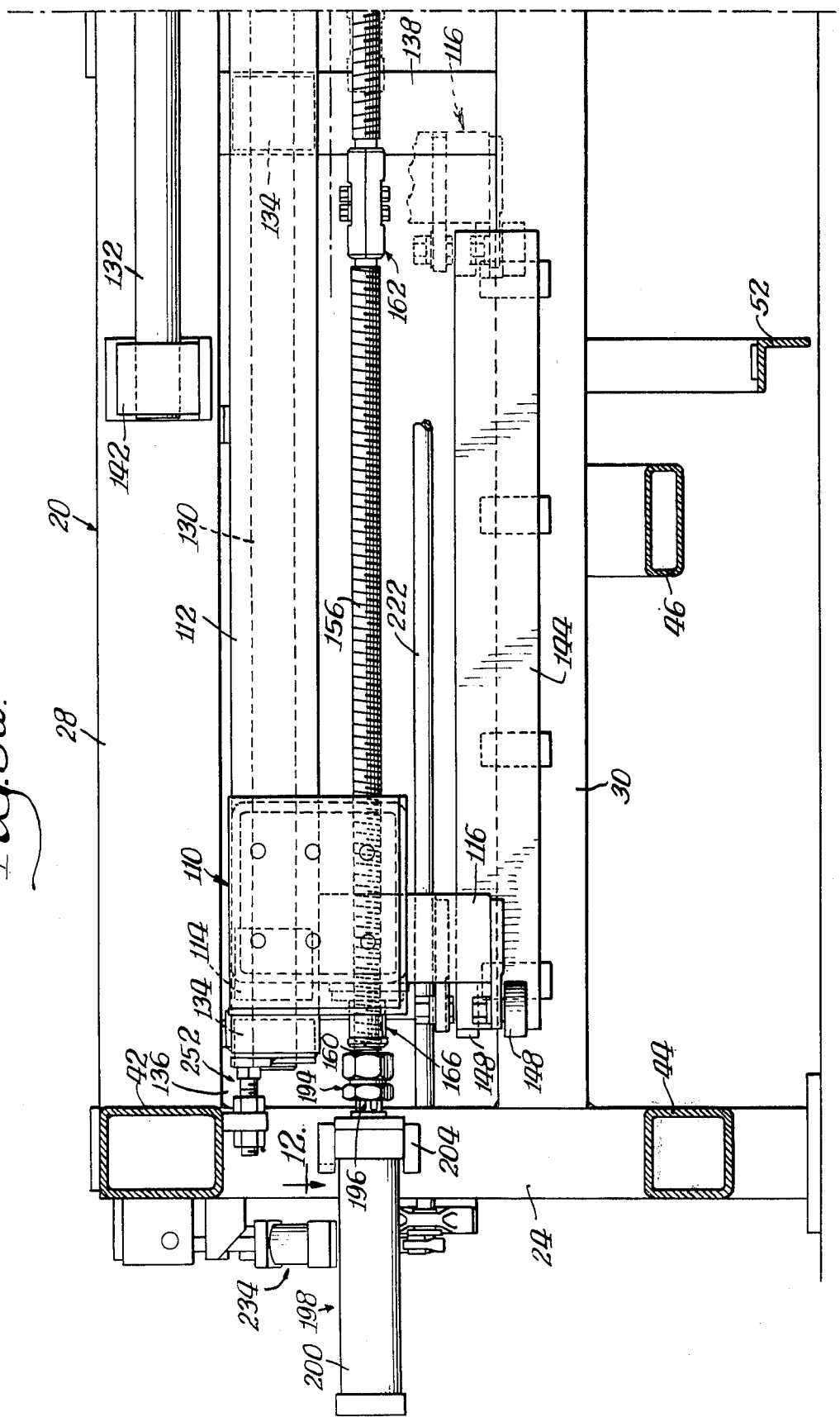

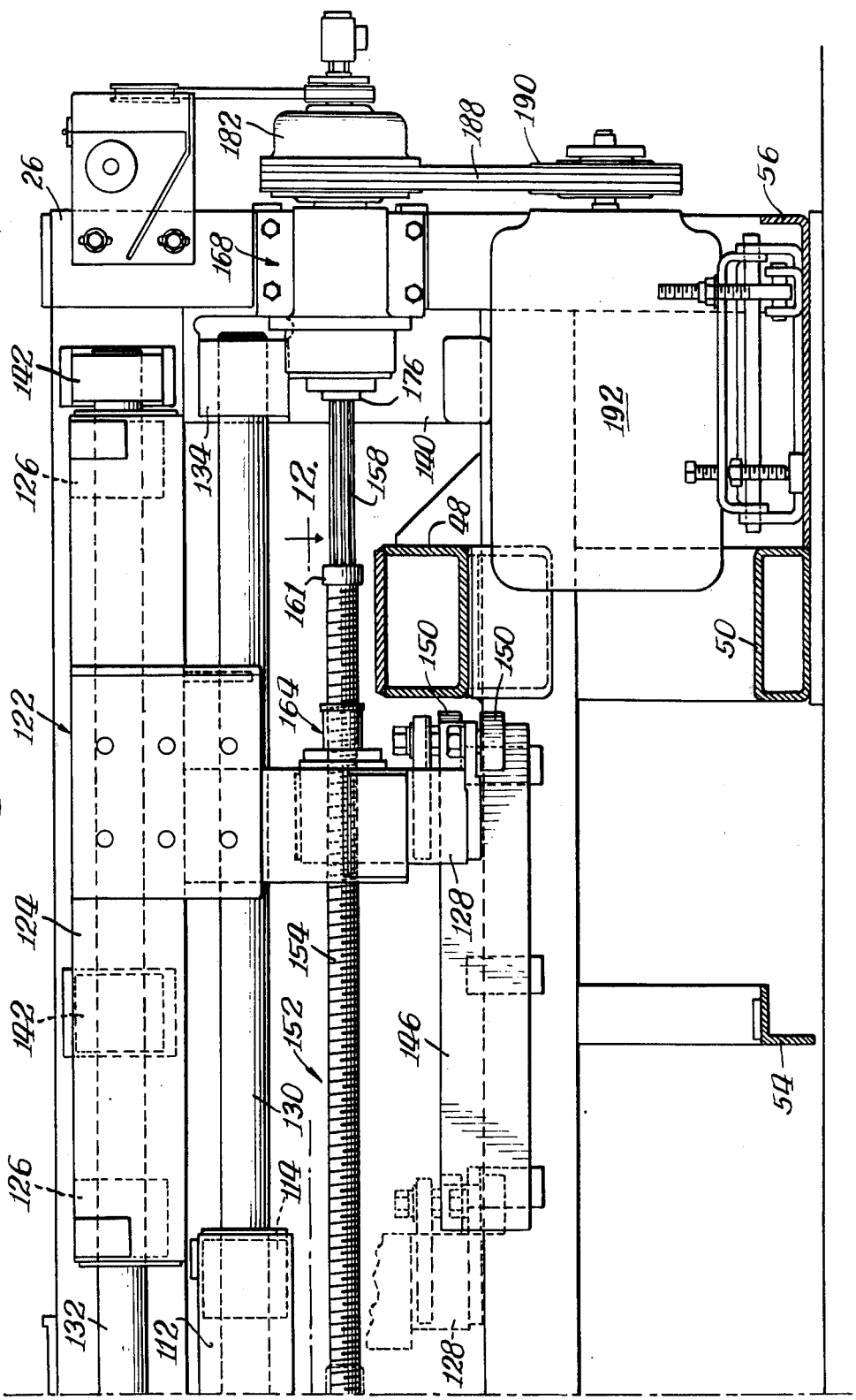

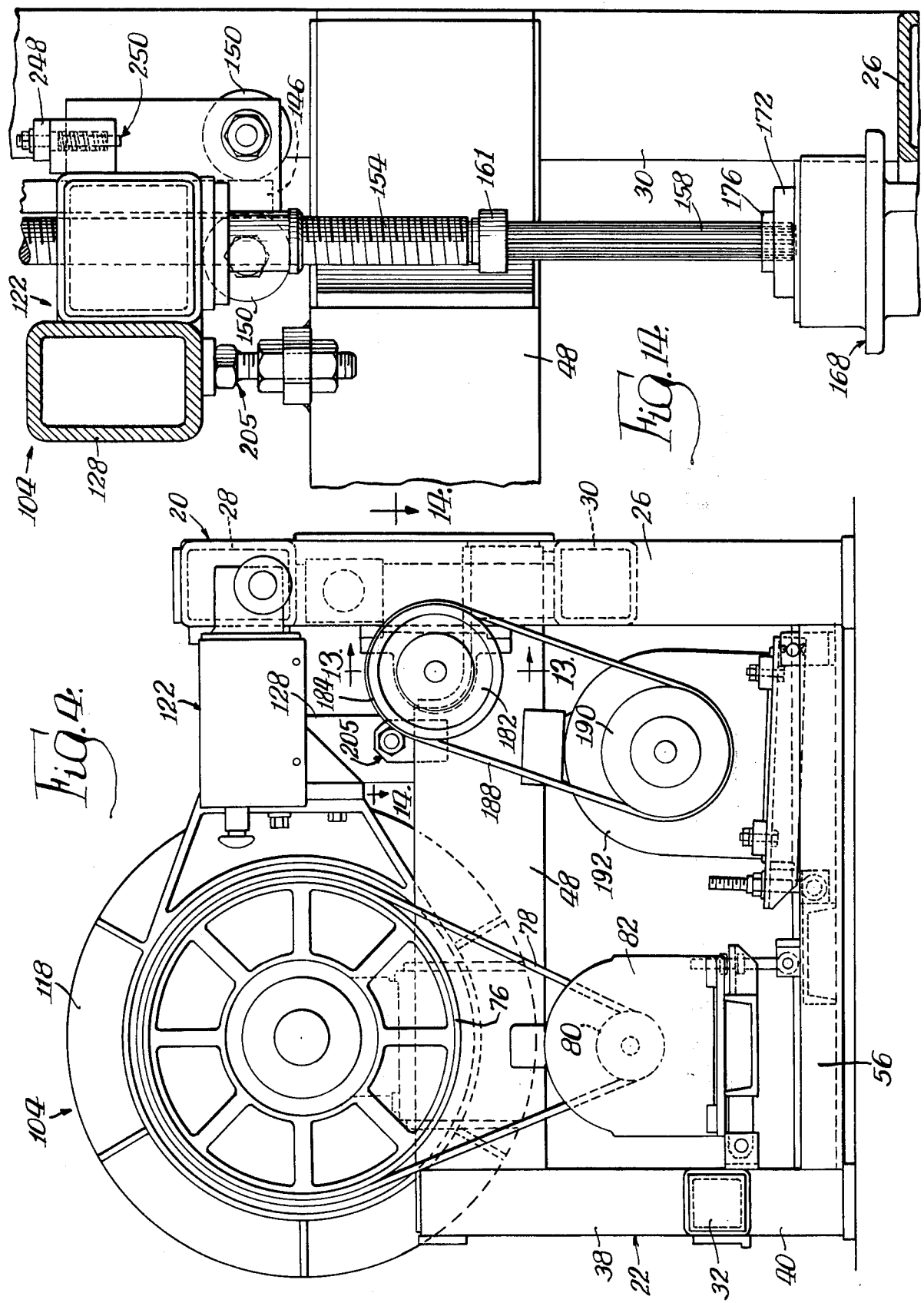

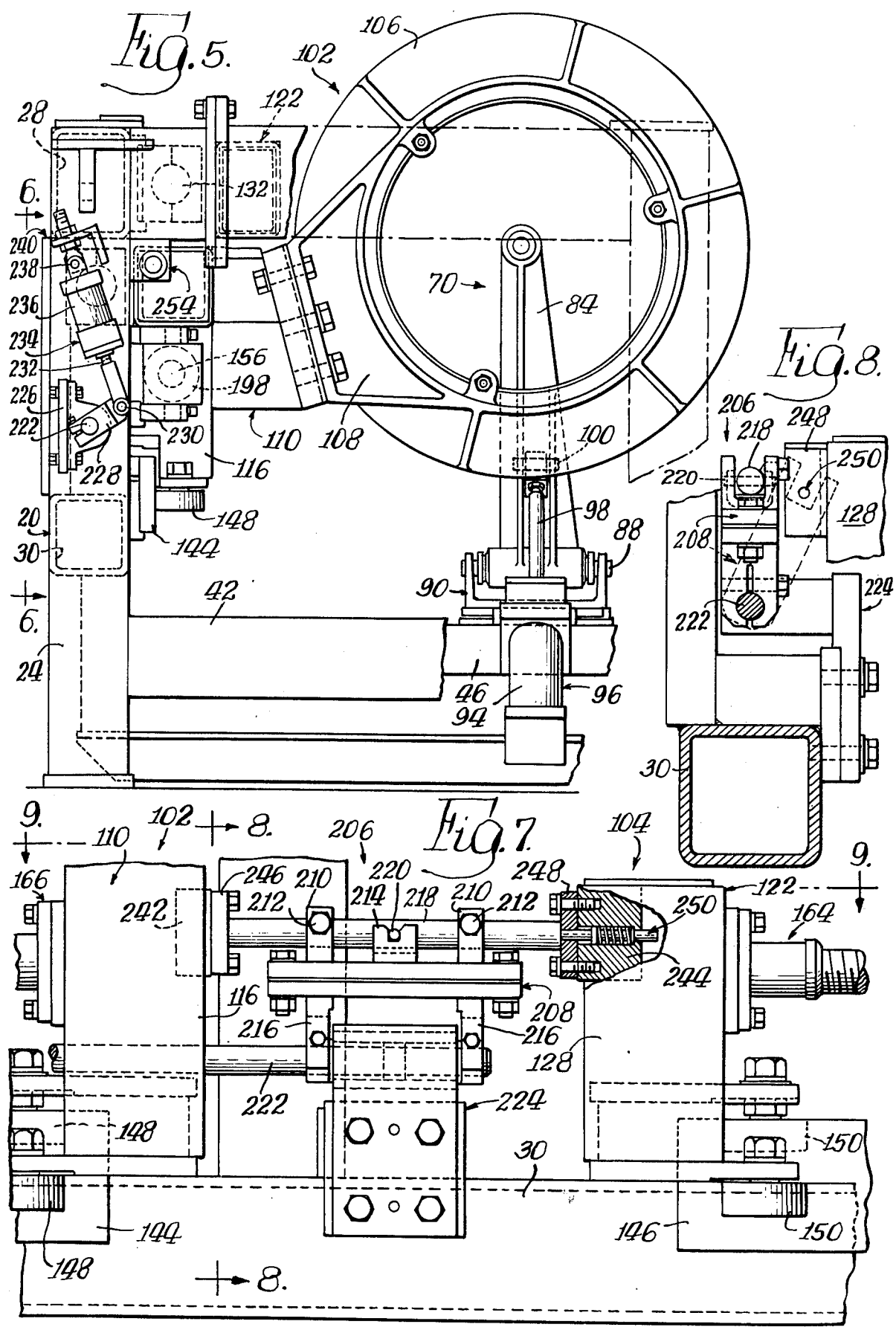

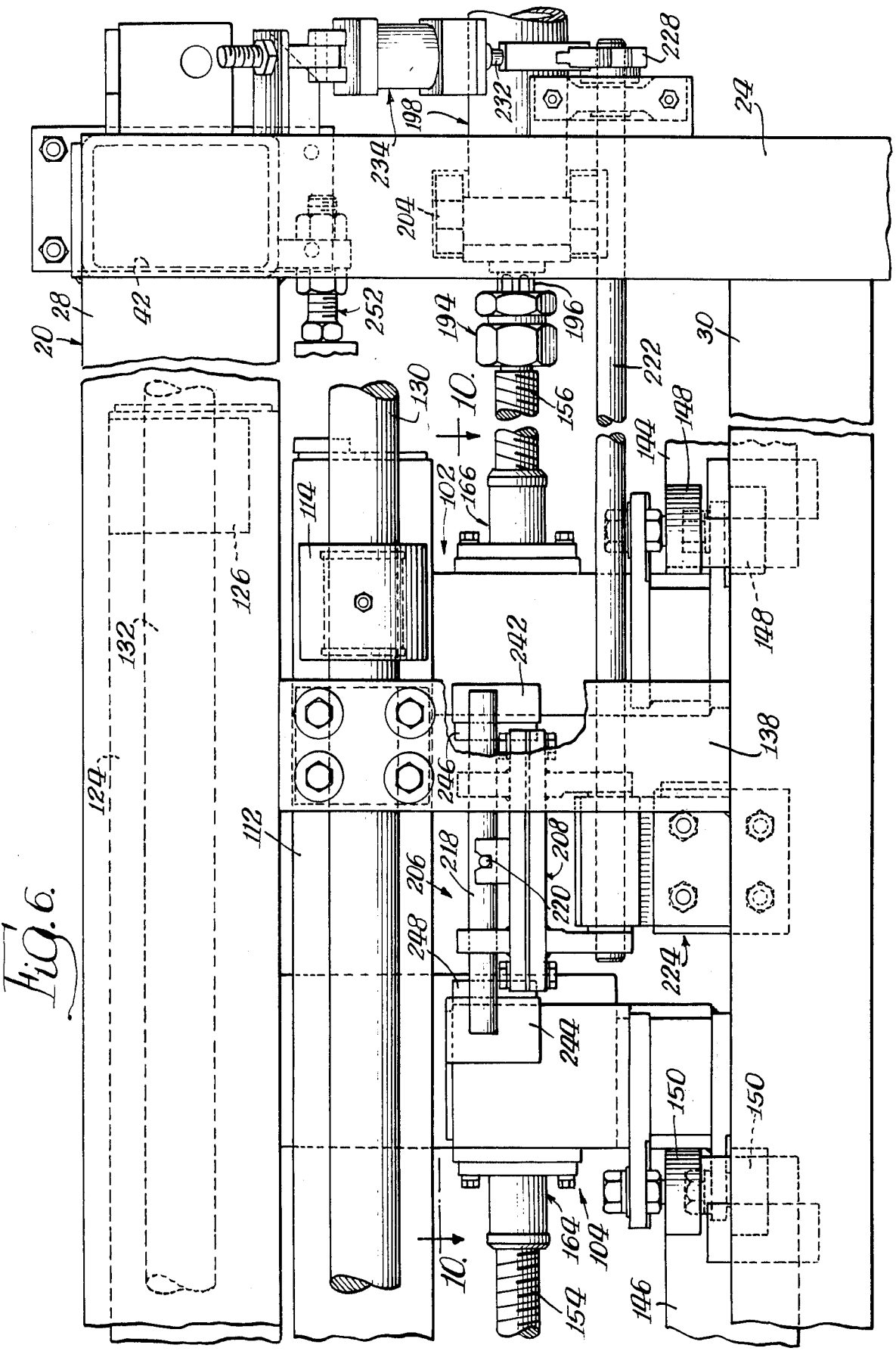

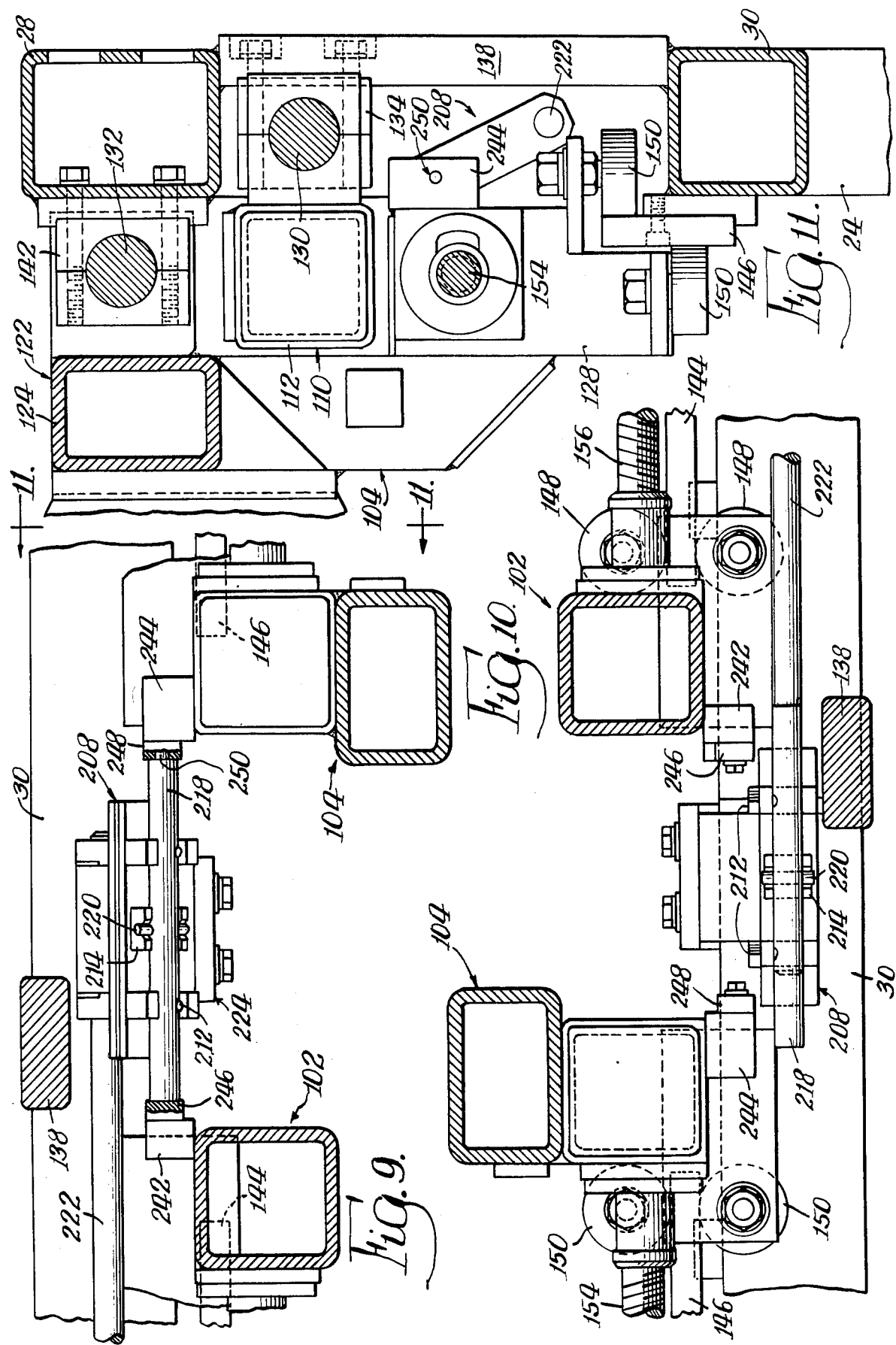

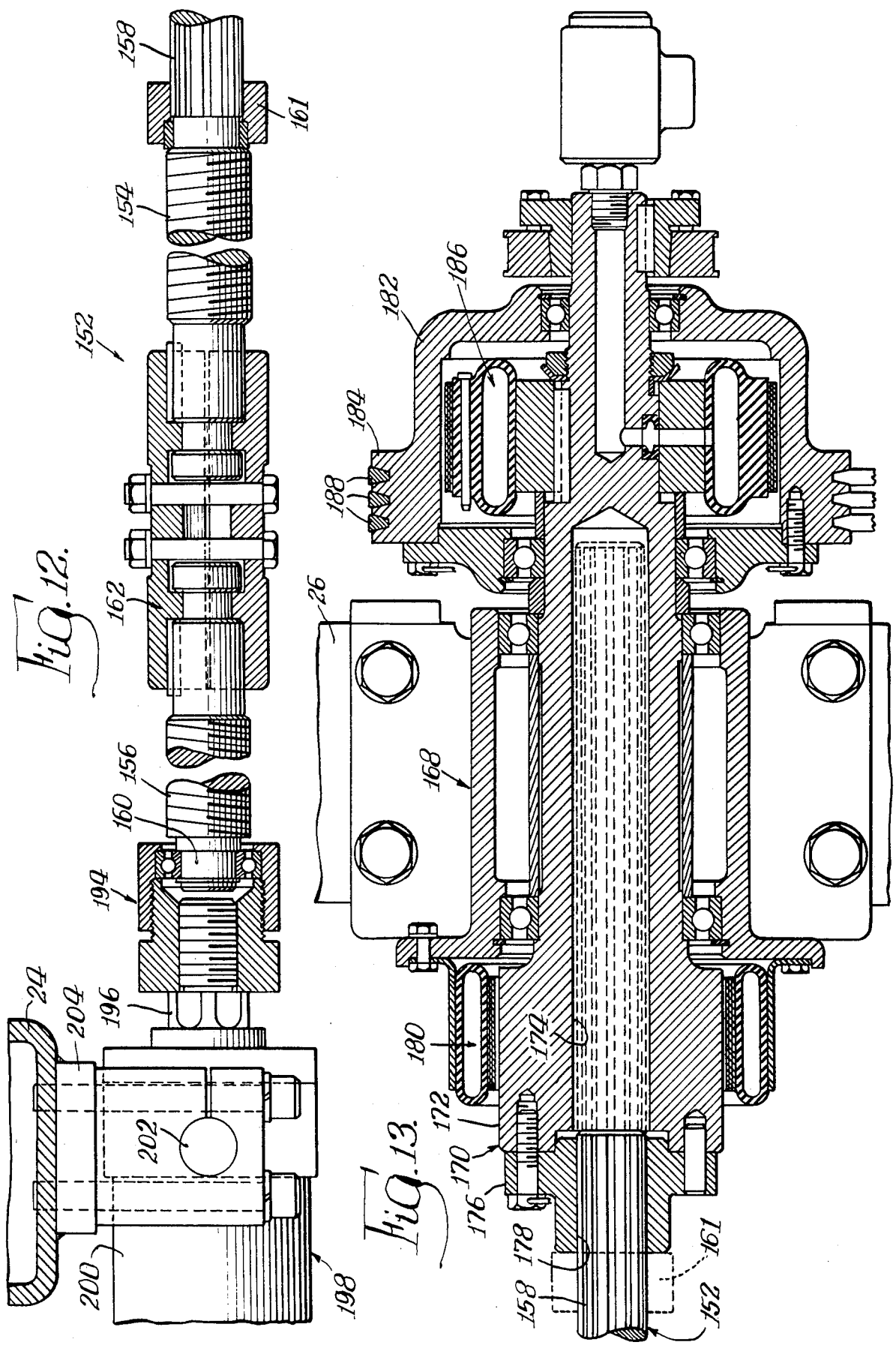

TIRE BUILDING APPARATUS

BACKGROUND OF THE INVENTION

One type of known tire building apparatus comprises drum means that includes an intermediate drum assembly and end drum assemblies which in starting or initial positions thereof provide a substantially cylindrical surface for supporting tire carcass material in the form of a cylinder. After disposition of tire carcass material around the intermediate drum assembly, tire beads are pre-positioned by ring means and locked in place, the ring means are retracted, the intermedite drum assembly is expanded to form the tire carcass material into substantially torus configuration approximating that of a completed tire, breaker and thread components are applied to the crown portion of the tire carcass, and the ring means in association with inflatable ply turn-up bag means are employed to turn plys up and apply tire sidewall or other components to the sidewall portions of the formed tire carcass.

Known tire building apparatus of the character noted do not conveniently provide for precise location of the ring means in predetermined inward bead set positions.

SUMMARY OF THE INVENTION

The present invention relates to tire building apparatus of the general type described above wherein a novel unit main frame construction is employed to insure rigidity and alignment of the tire bead placing and end ply bag turn-up ring means with the drum means.

Also novel positive stop means are provided for locting the tire bead placing and end ply bag turn-up ring means in precise predetermined inward bead set positions.

The positive stop means comprises a gage holder and a gage member removably seated in the gage holder. With this arrangement, any one of a number of different gage members, of varying lengths corresponding to different bead set positions, may be seated in the gage holder.

In addition, means are provided for pivoting the gage holder whereby the gage member may be swung between an operative bead set locating position and an inoperative position permitting the tire bead placing and end ply bag turn-up ring means to be moved closer together for cooperation with the inflatable ply turn-up bag means.

Further, lead screw means are provided for effecting axial movement of the tire bead placing and end ply bag turn-up ring means, and the lead screw means are axially displaceable to accommodate positive engagement of both of the ring means with the aforesaid stop means.

Still further, the lead screw means are noramlly rotated by an electric motor energized in high speed and an intermediate air clutch activated under high pressure. However, as the tire bead placing and end ply bag turn-up ring means approach the positive stop means, the drive motor is successively energized in low speed and then de-energized while the air clutch is successively activated under low pressure and then de-activated, whereby to discontinue the drive force on the ring means and facilitate smooth contact of the latter with the stop means. Brake means may be utilized to maintain the contact of the ring means with the stop means.

BRIEF DESCRIPTION OF THE DRAWINGS

FIG. 1 is a front elevational view of a tire building apparatus embodying the principles of the present invention;

FIG. 2 is a plan view of the tire building apparatus of FIG. 1;

FIGS. 3a–3b, joined in end-to-end relation on the dot-dash centerline, show a longitudinal vertical sectional view taken substantially along the lines 3a—3a and 3b—b in FIG. 2 looking in the direction indicated by the arrows;

FIG. 4 is a vertical view taken substantially along the line 4—4 in FIG. 1 looking in the direction indicated by the arrows;

FIG. 5 is a vertical view taken substantially along the line 5-5 in FIG. 1 looking in the direction indicated by the arrows;

FIG. 6 is a partial rear elevational view taken substantially along the line 6—6 in FIG. 5 looking in the direction indicated by the arrows, and shows the positive stop means of the tire building apparatus;

FIG. 7 is a partial front elevational view of the positive stop means of the tire building apparatus;

FIG. 8 is a partial vertical sectional view taken substantially along the line 8—8 in FIG. 7 looking in the direction indicated by the arrows;

FIG. 9 is a partial horizontal sectional view taken substantially along the line 9—9 in FIG. 7 looking in the direction indicated by the arrows;

FIG. 10 is a partial horizontal sectional view taken substantially along the line 10—10 in FIG. 6 looking in the direction indicated by the arrows;

FIG. 11 is a partial vertical sectional view taken substantially along the line 11—11 in FIG. 9 looking in the direction indicated by the arrows;

FIG. 12 is a partial horizontal sectional view taken substantially along the line 12—12 in FIGS. 3a and 3b looking in the direction indicated by the arrows;

FIG. 13 is a partial vertical sectional view taken substantially along the line 13—13 in FIG. 4 looking in the direction indicated by the arrows; and FIG. 14 is a partial horizontal sectional view taken substantially along the line 14—14 in FIG. 4 looking in the direction indicated by the arrows.

DESCRIPTION OF THE PREFERRED EMBODIMENT

Referring now to FIGS. 1 and 2, the tire building apparatus shown therein comprises main frame means which includes a rear frame section 20 and a front frame section 22. The rear frame section 20 comprises vertical corner frame elements 24 and 26, and upper and lower longitudinal frame elements 28 and 30. The front frame section 22 comprises a longitudinal frame element 32, a vertical corner frame element 34 and an aligned foot extension frame element 36, and an intermediate vertical frame element 38 and an aligned foot extension frame element 40. Extending between the rear and front frame sections 20 and 22 are primary transverse or cross frame elements 42, 44, 46, 48 and 50, secondary transverse or cross frame elements 52 and 54, and a transverse platform unit 56.

The tire building apparatus also comprises rotatable tire building drum means 58 which includes an intermediate expandable drum assembly 60 and end drum assemblies 62 and 64. The drum means 58 does not form part of the present invention and may be of a construction as shown and described in U.S. Pat. No. 3,684,621, issued in the names of Larry C. Frazier and Emerson C. Bryant, on Aug. 15, 1972, and the copending application of Edwin E. Mallory and Emerson C. Bryant, Ser. No. 173,769, filed Aug. 23, 1971. The drum means 58 is mounted on a hollow main shaft 66 located between a head stock assembly 68 and a variable positionable tail stock assembly 70.

The head stock assembly 68 is suitably secured to the primary cross frame element 48 and includes a rotatable drive spindle 72 the inner end of which is connected to the adjacent end of the main shaft 66 by means of a coupler unit 74. The outer end of the head stock spindle 72 has a pulley 76 thereon which is drivingly connected by means of belting 78 to a pulley 80 on the drive shaft of an electric motor 82 mounted on the platform unit 56.

The tail stock assembly 70 includes a lever 84 in the outer end of which is rotatably mounted a sleeve 86 engageable with the adjacent end of the main shaft 66. The inner end of the lever 84 is pivotally mounted as at 88 in a bracket assembly 90 secured to the cross frame element 46. Also pivotally mounted as at 92 in the bracket assembly 90 is the cylinder 94 of a pneumatic piston and cylinder assembly 96. The outer end of the piston rod 98 of the assembly 96 is pivotally mounted as at 100 to the lever 84 intermediate of the ends thereof. Retraction of the piston rod 98 serves to swing the lever 84 and tail stock sleeve 86 away from the free end of the main shaft 66, while extension of the piston rod 98 serves to dispose the tail stock sleeve 86 in engagement with the end of the main shaft 66 for maintaining the latter in correct alignment during the tire building operation.

Arranged for axial inward and outward movement longitudinally of the drum means 58 are a pair of tire bead placing and end ply bag turn-up ring means 102 and 104. As shown for example in FIGS. 2, 3a and 3b, the ring means 102 comprises a tire bead placing and end ply bag turn-up ring member 106 having a rearwardly projecting bracket element 108, and associated movable frame means 110 which includes a longitudinally extending elongated frame member 112, rearwardly disposed ball bushing units 114 and a depending leg portion 116. Similarly, the ring means 104 comprises a tire bead placing and end ply bag turn-up ring member 118 having a rearwardly projecting bracket element 120, and associated movable frame means 122 which includes a longitudinally extending elongated frame member 124, rearwardly disposed ball bushing units 126 and a depending leg portion 128.

The means supporting the tire bead placing and end ply bag turn-up ring means 102 and 104 on the rear frame section 20 comprises lower and upper longitudinally extending stationary shafts 130 and 132. The lower shaft 130 is mounted by means of clamp members 134 to vertical bars 136, 138 and 140 secured between the upper and lower frame elements 28 and 30, while the upper shaft 132 is mounted by means of clamp members 142 to the front side of the upper frame element 28. The ball bushing units 114 and 126 of the movable frame means 110 and 122 are mounted respectively on the shafts 130 and 132 for axial movement therealong, with the frame members 112 and 124 being arranged in overlapping relation. In addition, vertical guide plates 144 and 146 are secured to the lower frame element 30 parallel to the shafts 130 and 132. The opposed sides of the guide plate 144 are engaged by rollers 148 carried at the lower end of the depending leg portion 116 of the movable frame means 110, and the opposed sides of the guide plate 146 are engaged by rollers 150 carried at the lower end of the depending leg portion 128 of the movable frame means 122. The described arrangement of the guide plates 144 and 146 and rollers 148 and 150 serves to facilitate axial movement of the ring means 102 and 104 while preventing pivotal movement of the latter.

Means for effecting axial movement of the tire beard placing and end ply bag turn-up ring means 102 and 104 comprises elongated lead screw means 152 which is formed with a right-hand thread section 154, a left-hand thread section 156, a first splined end section 158, and a second circular end section 160. A collar or limit means 161 is mounted at the junction of the two sections 154 and 158. The lead screw means 152 may be fabricated, for example, in two parts which are joined in end-to-end alignment by coupling means 162. The right-hand thread section 154 has threaded engagement with a bearing block 164 secured to the depending leg portion 128 of the movable frame means 122, while the left-hand thread section 156 has threaded engagement with a bearing block 166 secured to the depending leg portion 116 of the movable frame means 110.

Means for effecting rotation of the lead screw means 152, as best shown in FIG. 13, comprises stationary housing means 168 secured to the vertical corner frame element 26. Rotatably mounted in the housing means 168 is intermediate drive shaft means 170 which includes a shaft 172 with an elongated axial opening 174, and an inner end cap member 176 with an axial splined opening 178. The first splined shaft end section 158 has interfitting engagement with the splined cap opening 178 whereby the lead screw means 152 is rotatable with, and axially slidable relative to, the intermediate drive shaft means 170. Selectively operable air brake means 180 are provided between the housing means 168 and the intermediate drive shaft means 170 for braking the latter and the lead screw means 152. Rotatably mounted on the outer end of the shaft 172 is a drive hub 182 formed with a pulley section 184. Selectively operable air clutch means 186 are provided between the shaft 172 and the drive hub 182 for clutching the former to the latter. The drive hub 182 in turn, as best shown in FIG. 4, is drivingly connected by means of belting 188 to a pulley 190 on the drive shaft of an electric motor 192 mounted on the platform unit 56. As shown in FIGS. 3a and 12, the second shaft end section 160 is rotatably mounted in connector means 194 secured to the outer end of the piston rod 196 of a pneumatic piston and cylinder assembly 198. The cylinder 200 of the assembly 198 is pivotally mounted as at 202 in a bracket assembly 204 secured to the vertical corner frame element 24. The pneumatic assembly 198 serves to bias the lead screw means 152 axially in the direction of the intermediate drive shaft means 170. Additionally, as shown in FIGS. 4 and 14, stop means 205 are mounted on the primary cross frame element 48, and are engageable by the depending leg portion 128 of the movable frame means 122.

The lead screw means 152 has an axially-stationary operating position, and is biased toward and located in this position by means of the pneumatic assembly 198 (FIG. 3a) and the engagement of the lead screw collar 161 with the end cap member 176 of the intermediate drive shaft means 170 as shown in dotted lines in FIG. 13. The lead screw means 152 also has an axially-movable operating range, one position of which is shown for example in FIGS. 3a and 3b. As will be explained more fully hereinafter, when the lead screw means 152 is in its axially-stationary operating position, rotation thereof effects movement of each of the tire bead placing and end ply bag turn-up ring means 102 and 104 with respect to the transverse centerline of the drum means 58 through a given distance per revolution of the lead screw means 152; when the lead screw means 152 is in its axially-movable operating range, rotation thereof effects movement of the ring means 102 with respect to the transverse centerline of the drum means 58 through a distance twice said given distance per revolution of the lead screw means 152.

Positive stop means indicated generally at 206 in FIG. 1 is carried by the rear frame section 20 and is engageable by the tire bead placing and end ply bag turn-up ring means 102 and 104 for locating the latter in predetermined inward bead set positions. The positive stop means 206, as shown in FIGS. 6–10, comprises a pivotal gage holder 208 having upstanding bifurcated arm portions 210 with set screws 212, an intermedite upstanding U-shaped slotted locator block 214, and depending leg portions 216. Removably seated in the arm portions 210 is a gage member or bar 218 which has opposed lateral pin members 220 received in the locator block 214 for axial positioning and which is retained in position by the set screws 212. The leg portions 216 are secured to the inner end of an elongated rod 222 rotatably mounted in a bracket assembly 224 secured to the lower frame element 30. The outer end of the rod 222, as shown in FIG. 5, is rotatably mounted in a bearing block 226 secured at the side of the corner frame element 24.

Also secured to the outer end of the rod 222 is a lever 228 the outer end of which is pivotally connected as at 230 to the lower end of the piston rod 232 of an angularly disposed pneumatic piston and cylinder assembly 234. The upper end of the cylinder 236 of the assembly 234 is pivotally mounted as 238 to a bracket assembly 240 secured at the side of the corner frame element 24. Extension of the piston rod 232 serves to effect forward pivoting of the gage holder 208 and gage bar 218 from the solid line position shown in FIG. 8 to the dotted line position (also see FIG. 11), while retraction of the piston rod 232 serves to return the gage holder 208 and gage bar 218 to the solid line position.

As shown in FIG. 7, extension blocks 242 and 244 are secured to the rear sides of the depending leg portions 116 and 128 of the movable frame means 110 and 122, and axially facing bearing plates 246 and 248 in turn are secured to the sides of the extension blocks 242 and 244. The bearing plates 246 and 248 are engageable with the opposed ends of the gage bar 218 when the latter is in a forward pivoted position. Also, spring biased sensor bar means 250 is mounted in the extension block 244, with the inner end thereof projecting through the bearing plate 248 and being adapted for engagement with the adjacent end of the gage bar 218. The outer end of the sensor bar means 250 serves to actuate switch means (not shown) carried by the depending leg portion 128 and embodied in a system for controlling energization of the drive motor 192 and pressurization of the air clutch means 186 and the air brake means 180.

Further, as shown in FIGS. 2 and 6, stop means 252 are mounted at the junction of the vertical corner frame element 24 and the primary cross frame element 42, and are engageable by the movable frame means 110. The stop means 252, together with the stop means 205, serve to limit outward movement of the tire bead placing and end ply bag turn-up ring means 102 and 104. Also, as the movable frame means 110 closely approaches the stop means 252, it serves to actuate switch means (not shown) mounted on the main frame means and embodied in a system for controlling energization of the drive motor 192 and pressurization of the air clutch means 186 and the air brake means 180.

Operationally, the tire bead placing and end ply bag turn-up ring means 102 and 104, and the lead screw means 152, are initially disposed in the positions shown in FIGS. 1, 2, 3a and 3b. After tire carcass material has been placed around the intermediate drum assembly 60 and tire beads have been mounted in the ring members 106 and 118, the gage bar 218 is swung forwardly to the dotted line position shown in FIG. 8, the air clutch means 186 is activated under high pressure, and the lead screw means 152 is rotated in a forward direction by the electric drive motor 192 energized in high speed.

When the lead screw means 152 is rotated in a forward direction while in its axially-movable operating range, it is threaded axially through the bearing block 164 and is axially moved to the right from the position shown in FIG. 3b to the dotted line position shown in FIG. 13; and the bearing block 166 is moved with the lead screw means 152, and also is threaded along the lead screw thread section 156, to the right from the position shown in FIG. 3a toward the drum means 58 (FIGS. 1 and 2). As a result of this composite movement of the bearing block 166 to the right, the lead screw means 152 effects movement of the tire bead placing and end ply bag turn-up ring member 106 toward the tire bead placing and end ply bag turn-up ring member 118, with the member 106 being moved with respect to the transverse centerline of the drum means 58 through a distance twice said given distance per revolution of the lead screw means 152. In this connection, the pneumatic assembly 198, acting through the lead screw means 152, serves to maintain the depending leg portion 128 of the ring means 104 in abutting engagement with the stop means 205 until the lead screw collar 161 is engaged with the end cap member 176 of the intermediate drive shaft means 170 and the lead screw means 152 is disposed in its axially-stationary operating position.

When the lead screw means 152 is rotated in a forward direction while in its axially-stationary operating position, the lead screw thread sections 154 and 156 effect movement of the tire bead placing and end ply bag turn-up ring members 106 and 118 toward each other, with each member 106 and 118 being moved with respect to the transverse centerline of the drum means 58 through said given distance per revolution of the lead screw means 152.

As the ring members 106 and 118 approach their bead set positions, the sensor bar means 250 engages the adjacent end of the gage bar 218 and is thereby depressed. Initially, the sensor bar means 250 actuates first switch means (not shown) for energizing the electric drive motor 192 in low speed and activating the air clutch means 186 under low pressure, whereby to decrease the rate of movement of the ring members 106 and 108. Then, the sensor bar means 150 actuates second switch means (not shown) for de-energizing the electric drive motor 192, de-activating the air clutch means 186, and activating the air brake means 180, whereby to facilitate smooth contact of the bearing plates 246 and 248 with the opposed ends of the gage bar 218 as shown in FIGS. 7 and 9 and thereby locate the ring members 106 and 118 in precise bead set positions equal distances from the transverse centerline of the drum means 58. Preferably, the bearing plates 246 and 248 engage the gage bar 218 simultaneously. However, should the bearing plate 246 engage the bar 218 first, the lead screw means 152, because axially displaceable, will feed the bearing plate 248 into engagement with the bar 218 thereby accommodating positive engagement of both of the bearing plates 246 and 248 with the gage bar 218. By allowing a slight tolerance, the bearing plate 248 is prevented from engaging the bar 218 first. It will be appreciated that any one of a number of different gage bars, of varying lengths corresponding to different bead set positions, may be conveniently substituted for the gage bar 218.

With the tire beads placing and end ply bag turn-up ring members 106 and 118 located in precise bead set positions, the tire beads mounted in the ring members 106 and 118 are locked in position by known bead lock back-up means (not shown). Then the air brake means 180 is de-activated, the air clutch means 186 is activated under high pressure, and the lead screw means 152 is rotated in a reverse direction by the electric drive motor 192 energized in high speed.

When the lead screw means 152 is rotated in a reverse direction while in its axially-stationary operating position, the lead screw thread sections 154 and 156 effect movement of the tire bead placing and end ply bag turn-up ring means 102 and 104 (and ring members 106 and 118) away from each other from the positions shown in FIG. 7, with each member 106 and 118 being moved with respect to the transverse centerline of the drum means 58 through said given distance per revolution of the lead screw means 152.

As and when the depending leg portion 128 of the ring means 104 abuts the stop means 205 as shown in FIG. 14, and during rotation of the lead screw means 152 in reverse while in its axially-movable operating range, the lead screw means 152 is threaded axially through the bearing block 164 and is axially displaced to the left from the dotted line position shown in FIG. 13 to the position shown in FIGS. 3a and 3b; and the bearing block 166 is moved with the lead screw means 152, and also is threaded along the lead screw thread section 156, to the left toward the position shown in FIG. 3a. As a result of this composite movement of the bearing block 166 to the left, the lead screw means 152 effects movement of the tire bead placing and end ply bag turn-up ring member 106 away from the tire bead placing and end ply bag turn-up ring member 118, with the member 106 being moved with respect to the transverse centerline of the drum means 58 through a distance twice said given distance per revolution of the lead screw means 152.

As the movable frame means 110 of the ring means 102 closely approaches the stop means 252, the frame means 110 initially actuates third switch means (not shown) for energizing the electric drive motor 192 in low speed and activating the air clutch means 186 under low pressure, whereby to decrease the rate of movement of the ring member 106. Then, the frame means 110 actuates fourth switch means (not shown) for de-energizing the electric drive motor 192, de-activating the air clutch means 186, and activating the air brake means 180, whereby to facilitate smooth contact of the frame means 110 with the stop means 252 as shown in FIGS. 2 and 3a.

At this point, the intermedite drum assembly 60 is expanded to form the tire carcass material into substantially torus configuration approximating that of a completed tire, and breaker and thread components are applied to the crown portion of the tire carcass. Next, the gage bar 218 is swung to the upright inoperative position shown in solid lines in FIG. 8. Then, the tire beads placing and end ply bag turn-up ring means 102 and 104 (and ring members 106 and 118) are moved axially inwardly by the lead screw means 152, in the manner previously described to the positions shown in FIGS. 6 and 10; and the ring members 106 and 118, in association with known inflatable ply turn-up bag means (not shown) are employed to apply tire sidewall components to the side wall portions of the formed tire carcass. Finally, the ring members 106 and 118 are axially spread apart by the lead screw means 152, in the manner previously described, to the positions shown in FIGS. 1 and 2; and the completed tire may be removed from the drum means 58. During axial movement of the ring members 106 and 118, the tail stock assembly 70 is disposed in a downward position away from the end of the main shaft 66; during other stages of the tire building operation, the tail stock assembly 70 is disposed in the upright position shown in FIG. 1.

While there has been shown and described a preferred embodiment of the present invention, it will be understood by those skilled in the art that various rearrangements and modifications may be made therein without departing from the spirit and scope of the invention.

The invention claimed is:

1. In tire building apparatus, the combination of main frame means comprises a base frame portion, a rear frame portion integral with said base frame portion and having substantial longitudinal length, and an auxiliary frame portion; rotatable tire building drum means supported by said auxiliary frame portion on a longitudinal axis parallel to said rear frame porton; first and second tire bead placing means supported on said rear frame portion and movable axially inwardly and outwardly longitudinally of said drum means; and said rear frame portion, at the plane perpendicular to the midpoint of the axis of said rotatable tire building drum means and continuously for substantially the entire length of said rear frame portion, extending above a horizontal plane tangent to the bottom of said drum means whereby to form with said base frame portion rigid main frame means to maintain alignment of the tire building elements supported thereby.

2. The combination of claim 1 wherein said rear frame portion includes vertical corner frame elements, and upper and lower longitudinal frame elements; and wherein each of said first and second tire beads placing means comprises tire bead placing and end ply bag turn-up means supported on said longitudinal frame elements.

3. In tire building apparatus having main frame means, and rotatable tire building drum means supported by the main frame means, the combination of first and second tire bead placing and end ply bag turn-up ring means supported on the main frame means, elongated lead screw means for effecting movement of said first and second ring means axially inwardly and outwardly longitudinally of the drum means, said elongated lead screw means being formed with a right-hand thread section having threaded engagement with one of said ring means and a left-hand thread section having threaded engagement with the other of said ring means, support means mounting said lead screw means for rotation, power means for rotating said lead screw means, positive stop means carried by the main frame means and being engageable by said ring means for locating the latter in predetermined inward bead set positions, and means for reducing the speed of axial movement of said ring means as the latter closely approach said stop means and their corresponding inward positions.

4. The combination of claim 2 including a pair of stationary shafts secured to said longitudinal frame elements parallel to said drum means; wherein each of said ring means comprises a tire bead placing and end ply bag turn-up ring member, and a frame means; and wherein said frame means are respectively mounted on said stationary shafts for axial movement therealong.

5. The combination of claim 4 wherein said frame means each have a depending leg portion; and including vertical guide plate means carried by said lower longitudinal frame element parallel to said stationary shafts, and roller means carried at the lower ends of said depending leg portions for engagement with the opposed sides of said plate means whereby to facilitate axial movement of said ring means while preventing pivotal movement of the latter.

6. The combination of claim 4 wherein said frame means each include a longitudinally extending elongated frame member, and bushing units slidably mounting said frame member on one of said stationary shafts; and said frame members are arranged in overlapping relation.

7. The combination of claim 2 wherein said drum means is mounted on a main shaft projecting from a head stock assembly; and including a variable positionable tail stock assembly engageable with the free end of said main shaft for maintaining the latter in correct alignment.

8. The combination of claim 3 wherein said positive stop means is positioned for locating each of said ring means in an inward position an equal distance from the transverse centerline of the drum means.

9. The combination of claim 8 wherein said positive stop means comprises an elongated gage member the ends of which are engageable by said ring means.

10. The combination of claim 9 wherein said positive stop means comprises a gage holder carried by the main frame means, and said gage member is removably seated in said gage holder.

11. The combination of claim 10 wherein said gage holder is pivotally mounted relative to the main frame means; and including means for pivoting said gage holder whereby said gage member may be swung into and out of operative position.

12. In tire building apparatus having main frame means, and rotatable tire building drum means supported by the main frame means, the combination of first and second tire bead placing and end ply bag turn-up ring means supported on the main frame means, elongated lead screw means for effecting movement of said first and second ring means axially inwardly and outwardly longitudinally of the drum means, said elongated lead screw means being formed with a right-hand thread section having threaded engagement with one of said ring means and a left-hand thread section having threaded engagement with the other of said ring means, support means mounting said lead screw means for rotation, power means for rotating said lead screw means, positive stop means carried by the main frame means and being engageable by said ring means for locating the latter in predetermined inward bead set positions, and switch actuating means for reducing the rotational speed of said power means as said ring means closely approach said stop means and their corresponding inward positions.

13. In tire building apparatus having main frame means, and rotatable tire building drum means supported by the main frame means, the combination of first and second tire bead placing and end ply bag turn-up ring means supported on the main frame means, elongated lead screw means for effecting movement of said first and second ring means axially inwardly and outwardly longitudinally of the drum means, positive stop means carried by the main frame means and being engageable by said ring means for locating the latter in predetermined inward bead set positions, said elongated lead screw means being formed with a right-hand thread section having threaded engagement with one of said ring means and a left-hand thread section having threaded enggement with the other of said ring means and extending parallel to the drum means and having an axially-stationary operating position, support means mounting said lead screw means for rotation and axial movement, biasing means for urging said lead screw means axially in the direction of its axially-stationary operating position, rotatable means for rotating said lead screw means, and said lead screw means being axially displaceable to accommodate positive engagement of both of said ring means with said stop means.

14. The combination of claim 13 wherein said rotatable means comprises power means; and including switch actuating means for reducing the rotational speed of said power means as said ring means closely approach said stop means and their corresponding inward positions.

15. The combination of claim 14 wherein said biasing means comprises pneumatic means, and said switch actuating means for reducing the rotational speed of said power means also serves to reduce the pressure of said pneumatic means as said ring means closely approach said stop means and their corresponding inward positions.

16. The combination of claim 15 wherein said switch actuating means for reducing the rotational speed of said power means and reducing the pressure of said pneumatic means includes sensor bar means carried by one of said ring means and being engageable with and actuated by said stop means.

17. The combination of claim 15 including secondary stop means adjacent one of said thread sections; and wherein said lead screw means upon rotation when in said axially-stationary operating position effects movement of each of said first and second axially movable ring means with respect to the transverse centerline of the drum means through a given distance per revolution of said lead screw means, and said lead screw means upon rotation as and when said first axially movable ring means abuts said secondary stop means and as and when said lead screw means is thereby axially displaced from said axially-stationary operating position effective movement of said second axially movable ring means with respect to the transverse centerline of the drum means through a distance twice said given distance per revolution of said lead screw means.

* * * * *

UNITED STATES PATENT OFFICE
CERTIFICATE OF CORRECTION

Patent No. 4,048,002     Dated September 13, 1977

Inventor(s) Edwin E. Mallory

It is certified that error appears in the above-identified patent and that said Letters Patent are hereby corrected as shown below:

Title Page [75] Inventor: "Edwin F. Mallory" should be
--Edwin E. Mallory--.

Col. 8, Line 31, Claim 1

"comprises" should be --comprising--.

Col. 8, Line 53, Claim 2

"turn-up means" should be --turn-up ring means --.

Col. 10, Line 61, Claim 17

"effective" should be --effects--.

Col. 10, Line 22, Claim 13

"enggement" should be --engagement--.

Signed and Sealed this

Twenty-fourth Day of January 1978

[SEAL]

Attest:

RUTH C. MASON
Attesting Officer

LUTRELLE F. PARKER
Acting Commissioner of Patents and Trademar